US006631424B1

(12) United States Patent
McDonough et al.

(10) Patent No.: US 6,631,424 B1
(45) Date of Patent: *Oct. 7, 2003

(54) DISTRIBUTING INFORMATION USING A COMPUTER

(75) Inventors: John C. McDonough, Braintree, MA (US); Michael P. Amatucci, Bolton, MA (US); Louis A. Iannucci, Hudson, MA (US); David M. Ingham, Newton, MA (US); Thiagarajan Saravanan, Westborough, MA (US)

(73) Assignee: FMR Corp., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/926,516

(22) Filed: Sep. 10, 1997

(51) Int. Cl.⁷ .................................................. G06F 9/54
(52) U.S. Cl. ....................................... 709/330; 709/311
(58) Field of Search ................................ 709/203, 206, 709/235, 310–332, 200–253; 707/513

(56) References Cited

U.S. PATENT DOCUMENTS

| | | | |
|---|---|---|---|
| 5,159,685 A | 10/1992 | Kung | 395/575 |
| 5,287,505 A | 2/1994 | Calvert et al. | 395/600 |
| 5,548,715 A | 8/1996 | Maloney et al. | 395/183.04 |
| 5,664,106 A | 9/1997 | Caccavale | 395/200.54 |
| 5,724,514 A * | 3/1998 | Arias | 709/235 |
| 5,754,774 A * | 5/1998 | Bittinger et al. | 709/203 |
| 5,802,530 A * | 9/1998 | Hoff | 707/513 |
| 5,870,549 A * | 2/1999 | Bobo, II | 709/206 |
| 6,128,652 A * | 10/2000 | Toh et al. | 709/219 |
| 6,139,177 A * | 10/2000 | Venkatraman et al. | 700/83 |
| 6,223,217 B1 * | 4/2001 | Pettus | 709/219 |
| 6,233,601 B1 * | 5/2001 | Walsh | 709/202 |

FOREIGN PATENT DOCUMENTS

| | | | |
|---|---|---|---|
| EP | 0 474 058 A2 | 11/1992 | G06F/11/00 |
| EP | 0 747 840 A1 | 11/1996 | G06F/17/30 |
| FR | 1 591 358 | 5/1970 | |

OTHER PUBLICATIONS

Michael Goulde, "World Wide Web servers", v10,n9,p(32), Sep. 1995.*

Rivest, "The MD5 Message–Digest Algorithm", http://andrew2.andrew.cmu.edu/rfc/rfc1321.html, 25 pages, Apr. 1992.

(List continued on next page.)

*Primary Examiner*—St. John Courtenay, III
(74) *Attorney, Agent, or Firm*—Fish & Richardson P.C.

(57) ABSTRACT

A method is provided for use in distributing information (e.g., World-Wide Web pages) using a computer. Based on a request (e.g., a URL-based request) for the information, a remote function call (e.g., an RPC call) is selected to direct to a source (e.g., an application server) of the information. A predefined set of multiple requests (e.g., for creating a "frames" display) may include the request. Based on the request, a data object (e.g., including a URL from the request) may be created, and the data object may be made available to the source of the information. The remote function call may be made across a function call bridge (e.g., formed by RPC client and server software). Static or dynamic data may be provided. An operating system function may be invoked.

28 Claims, 4 Drawing Sheets

Microfiche Appendix Included
(4 Microfiche, 301 Pages)

OTHER PUBLICATIONS

Freier et al., "The SSL Protocol Version 3.0," http://home.netscape.com/eng/ssl3/ss;–toc.html, 3 pages, Mar. 1996.

"Netscape Data Security", http://cgi.netscape.com/newsref/ref/netscape–security.html, 4 pages, 1997.

"Persistent Client State HTTP Cookies", http://cgi.netscape.com/newsref/std/cookie_spec.html, 5 pages, 1997.

"Basic HTTP as defined in 1992", http://www.w3.org/pub/WWW/Protocols/HTTP/HTTP2.html, 31 pages, 1992.

Berners–Lee et al., "Hypertext Transfer Protocol—Http/1.0", http://ds.internic.net/rfc/rfc1945.txt, 53 pages, May 1996.

Fielding et al., "Hypertext Transfer Protocol—HTTP/1.1", http://www.w3.org/pub/WWW/Protocols/rfc2068/rfc2068, 143 pages, Jan. 1997.

Netscape's DDE Implementation, http://www.netscape.com/newref/std/ddeapi.html, Mar. 1995, 14 pages.

PCT Search Report dated Sep. 28, 1998.

Sun Microsystems, Inc., "RPC: Remote Procedure Call Protocol Specification Version 2". http://www.ietf.org/rfc1057.txt?number=1057, Jun. 1988, accessed on Nov. 24, 2000, pp. 1–21.

* cited by examiner

CREQUEST OBJECT ⎯ 60

| URL FORMING THE REQUEST | http://www/xyz/com/accounts/ab/page1.html |
|---|---|
| IP ADDRESS FOR CLIENT COMPUTER | 255.255.255.0 |
| COOKIES | |
| POINTER TO BUFFER | |
| ⋮ | ⋮ |

FIG. 3

DISTRIBUTING INFORMATION USING A COMPUTER

REFERENCE TO MICROFICHE APPENDIX

An appendix forms part of this application. The appendix, which includes a source code listing relating to an embodiment of the invention, includes 301 frames on 4 sheets of microfiche.

BACKGROUND OF THE INVENTION

The invention relates to distributing information using a computer.

Browser software such as Netscape® Navigator™ allows a computer system to request, retrieve, and display pages of this information from multiple World-Wide Web ("Web") server computers across the Internet. Each of these Web server computers may have its own authentication procedure (e.g., based on an end-user identification number and a password). For example, the browser software may request a page (e.g., a "frames" page) that specifies combining information from multiple other pages from different Web servers. Absent prior execution of the authentication procedure of every one of the different Web servers, the page leads to an incomplete display.

Typically, a Web application running on a Web server receives from the browser software an information request formed from a text string known as a Uniform Resource Locator ("URL"), decodes the URL to determine how to respond to the request, and then returns a response formatted in accordance with the browser software.

SUMMARY OF THE INVENTION

In general, in one aspect, the invention features a computer-based method for use in distributing information. According to the method, based on an Internet-standard protocol, a request for the information is received, and based on the request, a function call is selected to direct across a network connection to a source of the information.

Implementations of the invention may include one or more of the following features. The request may include a URL or a predefined set of multiple subrequests. The method may further include, based on the request, creating a data object configured to receive at least a portion of the information, and making the data object available to the source of the information. The method may further include, based on the function call, sending a network request across the network connection. The method may further include making an initial function call based on the request, making a network request based on the initial function call, and basing the function call on the network request. The method may further include, based on the request, determining a level of authorization to which the source of information corresponds, or, based on the function call, providing static or dynamic data. The method may further include, based on the function call and a predefined function set, providing the information, or, based on the function call and another predefined function set, invoking a function of an operating system.

In general, in another aspect, the invention features a computer-based method for managing a request for information received in the form of a URL. The method includes identifying application software that corresponds to the request, based on the identification, selecting a function call to apply to the application software, based on the request, producing a data object for receiving at least a portion of the information, and based on the function call and the data object, producing a network message to direct across the network connection to the application software.

In general, in another aspect, the invention features a computer-based method for managing a request for information received in the form of a URL. The method includes: across a network connection, receiving a network message corresponding to the request, based on the network message, producing a function call to direct to application software, based on the function call, providing the information requested, and based on another network message, sending the information in response to the request.

Among the advantages of the invention are one or more of the following. A Web user can execute a single centralized authentication or authorization procedure for multiple Web applications. The operation of each Web application is simplified because each application is able to handle a URL-based information request in the form of a remote function call. The Web user can be provided with a Web page display that is based on multiple Web applications that are tied together by remote function calls.

Other advantages and features will become apparent from the following description and from the claims.

BRIEF DESCRIPTION OF THE DRAWINGS

FIG. 3 is a block diagram of a data structure used in the procedure of FIG. 2.

DESCRIPTION OF THE PREFERRED EMBODIMENTS

Figure 1:
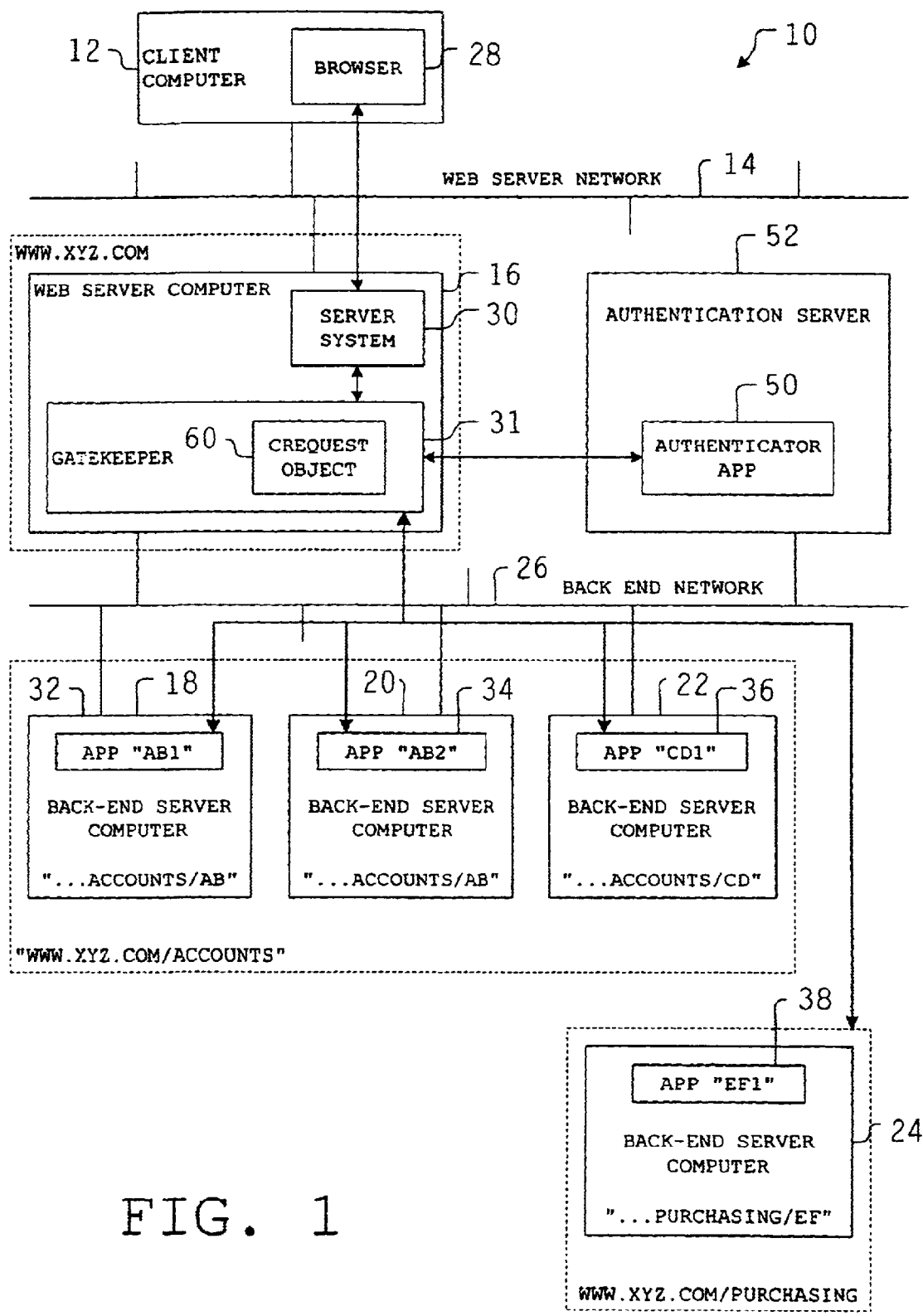
FIGS. 1, 4 are block diagrams of a computer system.

In the computer system 10 of FIG. 1, a client computer 12 is connected by a Web server network 14 (such as a network based on Internet and World-Wide Web protocols) to a Web server computer 16 that is coupled to multiple back-end server computers 18–24 by a back-end network 26. The client computer runs browser software 28 (such as Netscape® Navigator™ version 2.0 or 3.0) to gain access via server system software 30 and gatekeeper software 31 to information from one or more application software instances 32–38 running on one or more of the back-end server computers. The gatekeeper software runs either on the Web server computer (as shown in FIG. 1) or on another computer, in which case gatekeeper connection module software runs on the Web server computer to communicate with the gatekeeper software via application relay host software running on an intermediate computer.

As described below, the Web server computer is configured to receive information requests from the browser software and based on each request (absent an error) produce an RPC function call that is directed to the appropriate one of the application software instances. Thus, the application software instances need not be configured to process the information requests directly, which simplifies the operation of the application software instances.

The information available for access is organized into pages that are logically arranged in accordance with a hierarchical directory structure that allows the browser software to identify each of the pages by a Uniform Resource Locator string ("URL") such as "http:**www.xyz.com*accounts*ab*page1.html."(Each asterisk in this URL should be replaced with a backslash mark ("/") to create a URL executable by browser software.).

In such a URL, "www.xyz.com" refers to all of the aforementioned application software instances generally, "/accounts" refers to a group of these instances, and "/ab" refers to a specific type of the instances in the "/accounts" realm, as described below. The instances for which an end-user has authorization is known as a "realm".

At the client computer, an end-user specifies the pages of information for retrieval by directing the browser software to send URL-based requests to the server system software (step 210;). (As described in commonly-assigned U.S. Serial No. 08/925,212, entitled "CONTROLLING ACCESS TO INFORMATION", filed on Sep. 8, 1997 incorporated by reference, the gatekeeper software exercises authenticator application software 50 running on an authentication server computer 52 to prevent the end-user from gaining access to any of the pages other than those of the pages for which the end-user has authorization.)

Figure 2:
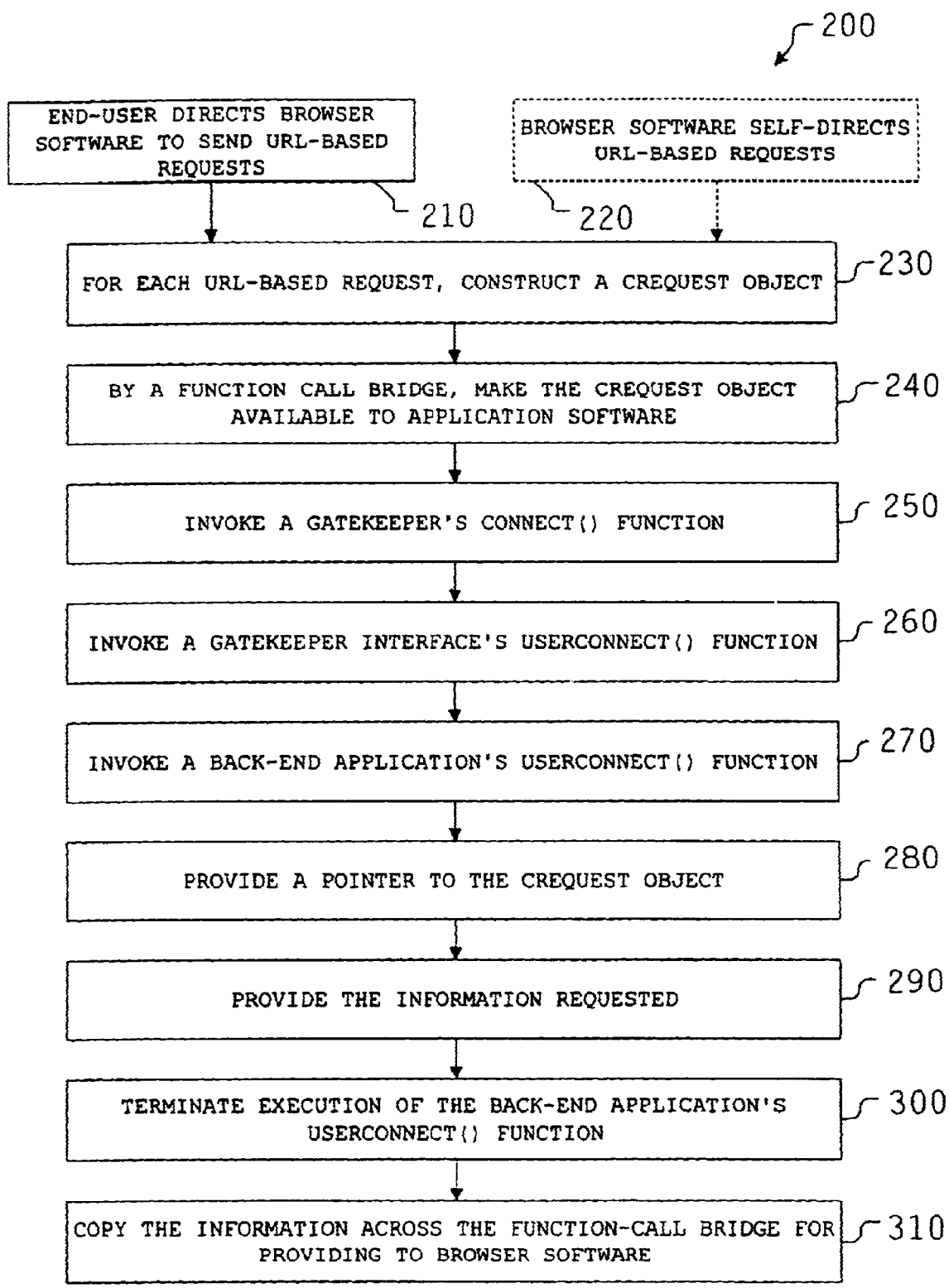
FIG. 2 is a flow diagram for a procedure executed by the computer system.

Alternatively (as noted by dashed lines in FIG. 2), the browser software self-directs the URL-based requests to gather information from multiple sources to produce a "frames" display in accordance with a "frames" specification received (as described below) in a response to a previous URL-based request (step 220).

Each of these URL-based requests is sent from the client computer to the server system software in accordance with a protocol known as HyperText Transport Protocol ("HTTP") (described in Fielding et al, "Hypertext Transfer Protocol—HTTP/1.1" (January 1997), <http:**www.ics.uci.edu*pub*ietf*http*rfc2068.txt>, incorporated by reference), and includes pieces of information such as the associated URL, an Internet Protocol address for the client computer, any cookies (described in "Persistent Client State HTTP Cookies", <http:**home.netscape.com*newsref*std*cookie_spec.html>, incorporated by reference) held by the client computer, and a pointer to a memory buffer allocated for returning information to the client computer. (Each asterisk in these two URLs should be replaced with a backslash mark ("/") to create URLs executable by browser software.). For each of these URL-based requests, a data structure known as a "CRequest" object 60 (the contents of which are exemplified in FIG. 3) is constructed that includes each of these pieces of information (step 230). Using a function-call bridge 48, 58 (FIG. 4) described below, the CRequest object is made available to the one of the application software instances specified in the URL (step 240).

The CRequest object in FIG. 3 indicates that the URL-based request is directed to an "/accounts" realm that consists of pages of information from application software instances 32, 34, 36 (FIG. 1). Also in the CRequest object of FIG. 3, "ab" indicates that the gatekeeper should direct the CRequest object to application software instance 34 or 32. For example, for the purpose of load-balancing, scaling, or fault-tolerance, application software instance 34 may provide the same pages of information as application software instance 32. Preferably in such a case, if application software instance 34 has already been used for processing an "AB"-type request in a session, application software instance 34 is re-used for each subsequent "AB"-type request in the session. Such re-use not only facilitates management of load-balancing, but also takes advantage of caching and similar performance-enhancement features provided by the back-end server computer.

Figure 4:
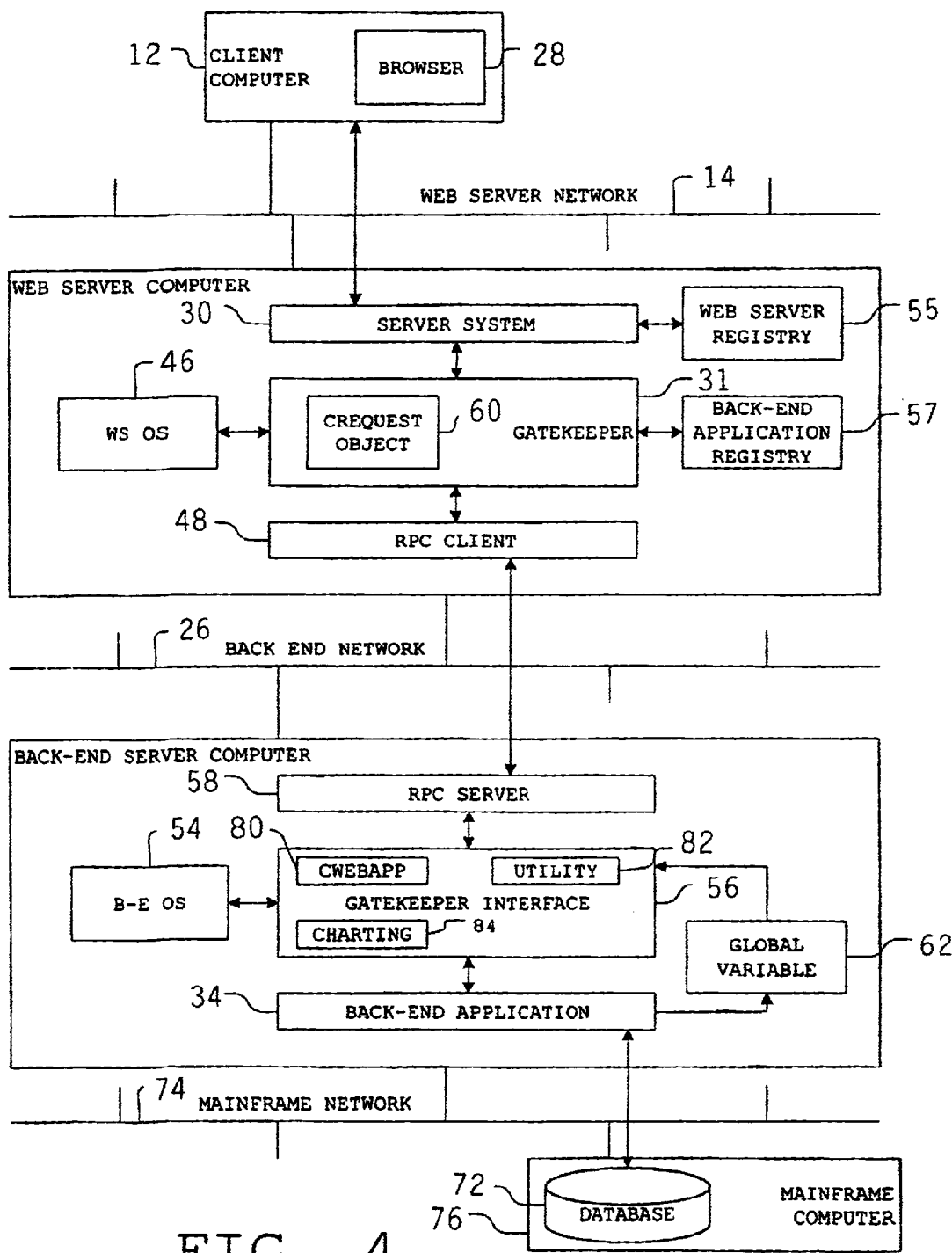

Referring now also to FIG. 4, the Web server computer also runs Web server operating system software ("WS OS") 46 and Remote Procedure Call ("RPC") client software 48. The back-end server computer also runs back-end server operating system software ("B-E OS") 54, gatekeeper interface software 56 (provided as described below), and RPC server software 58. By converting between local function calls and network requests (as described in "RPC: Remote Procedure Call Protocol Specification Version 2" (June 1988) <http:**reference.nrcs.usda.gov*ietf*rfc*1100*rfc1057.txt>, incorporated by reference), the RPC client and server software pair provide the function-call bridge mentioned above that allows the gatekeeper software to invoke directly functions provided by the gatekeeper interface software. (Each asterisk in this URL should be replaced with a backslash mark ("/") to create a URL executable by browser software.).

The Web server computer also has a Web server registry 55 that associates types of URLs with software functions. In particular, if the request's URL includes "0.401", the server system software determines from the Web server registry that a Connect ( ) function of the gatekeeper software should be invoked. (The association of "0.401" with the Connect ( ) function is made when the gatekeeper software — implemented as one or more Dynamic Link Library ("DLL") files—is started and registers at that time with the server system software.)

Similarly, the Web server computer also has a back-end application registry 57 that associates application software instances with respective UserConnect ( ) functions (described below). Each of these associations is provided when the respective application software instance is started.

After the Connect ( ) function is invoked (step 250), the gatekeeper software parses the URL to determine that the application software instance 34 (hereafter referred to as the back-end application software 34) should process the request. Across the RPC function-call bridge and based on the appropriate association in the back-end application registry, the gatekeeper software then invokes the gatekeeper UserConnect ( ) function of the gatekeeper interface software (step 260). The back-end server computer has a global variable 62 (known as "g_pTheApp") that is set when the back-end application software is started and that points to a back-end UserConnect ( ) function provided by the back-end application software. Using g_pTheApp, the gatekeeper interface software invokes the back-end UserConnect ( ) function (step 270), which is provided with a pointer to the CRequest object (step 280). Thus, the back-end application software receives an information request in the form of a function call.

Next, the back-end application software provides the information requested (step 290). For example, the information requested may include text data derived from a database 72 stored across a mainframe network 74 on a mainframe computer 76, and provided for display at the client computer.

Execution of the back-end UserConnect ( ) function then terminates (step 300). The information is copied across the function-call bridge for providing to the browser software in response to the URL-based request (step 310).

The gatekeeper interface software is provided by incorporating predefined function sets (known as "C++ classes") into source code for the back-end application software, and then compiling the source code. The predefined function sets include a CWebApp function set 80 that can serve as the sole basis for a simple version (e.g., for supplying pages of static information) of the back-end application software. The CWebApp function set allows the back-end application software to register with (and remove such registration from) the back-end application registry and to load files in which the pages of static information are stored. To incorporate the CWebApp function set (and therefore to create the source code for the simple version of the back-end application software), the source code includes text lines such as the following:

```
#include "catalina.h"
#define                               HKEY_APP
    "SOFTWARE\\Fidelity\\Catalina\\AppName"
CWebApp theApp (HKEY_APP);
void main ( )
{
    theApp.SetActive( ); //this is what gets the server //
        listening for requests from the gatekeeper
}
```

The source code is then compiled to produce object code that is subsequently linked (with an SDKcore.dll file containing object code versions of functions in the CWebApp function set) to produce directly-executable instructions for the simple version of the back-end application software.

Source code for a more complex version of the back-end application software includes at least the following text line to override (i.e., redirect) a default CWebApp UserConnect ( ) function provided by the CWebApp function set with an application-specific UserConnect ( ) function:

SDKError CWebApp::UserConnect(CRequest& request);
By overriding, the more complex version is able to provide not only pages of static information but also, e.g., pages that combine dynamic information (e.g., a stock price) and static information. The application-specific UserConnect ( ) function specifies retrieving the pieces of information from the CRequest object and serves (as described above) as a main entry point for the URL-based request into the back-end application software.

In addition to the CWebApp function set, utility function sets 82 are provided (with SDKutils.dll and SDKlog.dll files for linking) for use by the back-end application software. A generic utility function set (including CEventLog, CEventLogViewer, and CRegistry classes) facilitates the invocation of functions provided by the B-E OS. An infrastructure-related utility function set (including a CMegaMonLog class) allows an entry to be added to a B-E OS event log as well as to a back-end application log. A performance-related utility function set (including a CPerfMon class) allows the back-end application software to expose performance data to the B-E OS.

One or more of the pages of information may include text formatted in accordance with, e.g., a specification known as Hypertext Markup Language ("HTML"). The browser software may be, e.g., Netscape® Navigator™ version 2.0 or 3.0(as mentioned above) or Microsoft® Internet Explorer version 3.0, or any other software that can generate a URL-based request. One or more of the server computers may include, e.g., a Compaq ProLiant running an operating system such as Microsoft® Windows® NT, or an IBM® RS6000 running AIX. One or more of the networks may be based on a protocol such as Transmission Control Protocol and Internet Protocol ("TCP/IP"). The client computer may include a personal computer having a processor such as an Intel® Pentium®. One or more of the operating systems may be, e.g., Microsoft® Windows® NT, Microsoft® Windows ®95, UNIX®, OS/2@, or Java™.

The mainframe computer may include, e.g., an IBM® 3090 running an operating system such as IBM® MVS 5.2.

The technique (i.e., the procedure described above) may be implemented in hardware or software, or a combination of both. Preferably, the technique is implemented in computer programs (such as the gatekeeper software and gatekeeper interface software described above) executing on programmable computers that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the client computer.

Each program is preferably implemented in a high level procedural or object-oriented programming language (such as Microsoft Visual C++ version 4.0) to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the function-call bridge may be arranged so that each back-end application is able to invoke directly functions of one or more of the other back-end applications.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

What is claimed is:

1. A computer-based method for use in distributing information, the method comprising
    based on an internet-standard protocol, receiving a request for the information;
    based on the request, producing a data object that includes a storage indicator that identifies a storage location in a storage device associated with a source of the request;
    based on the request, determining which one of a plurality of function calls to direct across a network connection to a source of the information; and
    based on the function call and the data object, providing the information to the storage location.

2. The method of claim 1, wherein the request comprises a URL.

3. The method of claim 1, wherein the request comprises a predefined set of multiple subrequests.

4. The method of claim 1, further comprising
    based on the function call, sending a network request across the network connection.

5. The method of claim 1, further comprising
    based on the request, making an initial function call;
    based on the initial function call, making a network request; and
    basing the function call on the network request.

6. The method of claim 1, further comprising based on the request, determining a level of authorization to which the source of information corresponds.

7. The method of claim 1, wherein the information comprises static data.

8. The method of claim 1, wherein the information comprises dynamic data.

9. The method of claim 1, wherein providing the information is further based on a predefined function set.

10. The method of claim 9, further comprising based on the function call and another predefined function set, invoking a function of an operating system.

11. The method of claim 1, further comprising based on the request, determining at least one other of the plurality of function calls to direct across the network connection to the source of the information.

12. A computer-based method for responding to a request for information received in the form of a URL, the method comprising based on the request, determining which one of a plurality of function calls to direct across the network connection to application software;

based on the request, producing a data object that includes a storage indicator that identifies a storage location in a storage device associated with a source of the request;

based on the function call, sending a network message across the network connection to make the data object available to the application software;

by the data object, providing the information requested; and based on another function call and another network message, directing the information to the storage location.

13. A computer-based method for managing a request for information received in the form of a URL, the method comprising identifying application software that corresponds to the request;

based on the identification, determining which one of a plurality of function calls to apply to the application software;

based on the request, producing a data object that includes a storage indicator that identifies a storage location in a storage device associated with a source of the request;

based on the function call and the data object, producing a network message to direct across the network connection to the application software; and based on the function call and the data object, providing the information to the storage location.

14. A computer-based method for managing a request for information received in the form of a URL, the method comprising across a network connection, receiving a network message corresponding to the request;

based on the network message, producing one of a plurality of function calls to direct to application software;

based on the request, producing a data object that includes a storage indicator that identifies a storage location in a storage device associated with a source of the request;

based on the function call and the data object, providing the information requested; and based on another network message, sending the information to the storage location in response to the request.

15. Computer software, residing on a computer-readable storage medium, comprising instructions for use in a computer system to distribute information, the instructions causing the computer system to:

based on an Internet-standard protocol, receive a request for the information;

based on the request, producing a data object that includes a storage indicator that identifies a storage location in a storage device associated with a source of the request;

based on the request, determine which one of a plurality of function calls to direct across a network connection to a source of the information; and based on the function call and the data object, providing the information to the storage location.

16. The computer software of claim 15, wherein the request comprises a URL.

17. The computer software of claim 15, wherein the request comprises a predefined set of multiple subrequests.

18. The computer software of claim 15, wherein the computer software further comprises instructions for causing the computer system to:

based on the function call, send a network request across the network connection.

19. The computer software of claim 15, wherein the computer software further comprises instructions for causing the computer system to:

based on the request, make an initial function call;

based on the initial function call, make a network request; and base the function call on the network request.

20. The computer software of claim 15, wherein the computer software further comprises instructions for causing the computer system to:

based on the request, determine a level of authorization to which the source of information corresponds.

21. The computer software of claim 15, wherein the information comprises static data.

22. The computer software of claim 15, wherein the information comprises dynamic data.

23. The computer software of claim 15, wherein providing the information is further based on a predefined function set.

24. The computer software of claim 23, wherein the computer software further comprises instructions for causing the computer system to:

based on the function call and another predefined function set, invoke a function of an operating system.

25. The computer software of claim 15, wherein the computer software further comprises instructions for causing the computer system to:

based on the request, determine at least one other of the plurality of function calls to direct across the network connection to the source of the information.

26. Computer software, residing on a computer-readable storage medium, comprising instructions for use in a computer system to respond to a request for information received in the form of a URL, the instructions causing the computer system to:

based on the request, determine which one of a plurality of function calls to direct across the network connection to application software;

based on the request, produce a data object that includes a storage indicator that identifies a storage location in a storage device associated with a source of the request;

based on the function call, send a network message across the network connection to make the data object available to the application software;

by the data object, provide the information requested; and based on another function call and another network message, direct the information to the storage location.

27. Computer software, residing on a computer-readable storage medium, comprising instructions for use in a computer system to manage a request for information received in the form of a URL, the instructions causing the computer system to:

identify application software that corresponds to the request;

based on the identification, determine which one of a plurality of function calls to apply to the application software;

based on the request, produce a data object that includes a storage indicator that identifies a storage location in a storage device associated with a source of the request; and based on the function call and the data object, produce a network message to direct across the network connection to the application software; and based on the function call and the data object, providing the information to the storage location.

28. Computer software, residing on a computer-readable storage medium, comprising instructions for use in a computer system to manage a request for information received in the form of a URL, the instructions causing the computer system to:

across a network connection, receive a network message corresponding to the request;

based on the network message, produce one of a plurality of function calls to direct to application software;

based on the request, producing a data object that includes a storage indicator that identifies a storage location in a storage device associated with a source of the request;

based on the function call and the data object, provide the information requested; and based on another network message, send the information to the storage location in response to the request.

* * * * *